United States Patent Office 3,367,912
Patented Feb. 6, 1968

3,367,912
CURING PROCESS FOR EPOXY RESINS
Harold Charles Stalter, Edwardsburg, Mich., assignor to Miles Laboratories, Inc., Elkhart, Ind., a corporation of Indiana
No Drawing. Filed May 17, 1966, Ser. No. 550,607
3 Claims. (Cl. 260—47)

This invention relates to an improved curing process for epoxy resins. More particularly, it relates to the use of 4-N,N-dimethylamino-2-butyn-1-ol as a curing catalyst for epoxy resins.

Epoxy resins are well known in the organoplastic art as being polyethers having alternating aromatic and aliphatic centers. The most common type of epoxy resin is prepared by the reaction of a dihydric phenol, such as bisphenol A, with epichlorohydrin in the presence of sodium hydroxide. Most commercial epoxy resins are formulated to contain an excess of epichlorohydrin so that the polymers formed will have terminal epoxide groups.

Curing catalyst are employed to initiate and promote self-condensation and polymerization of the resin by reaction between epoxy groups and hydroxy groups already on the resin. Such catalysts also promote reaction between the functional groups on an epoxy resin with functional groups on other modifying resins or chemicals present in the reaction system. These curing catalysts are employed in relatively small mounts and do not themselves serve as direct crosslinking agents.

Typical prior art curing catalysts for epoxy resins are tertiary amines, amine salts, boron trifluoride complexes and amine borates.

It has now been unexpectedly found that 4-N,N-dimethylamino-2-butyn-1-ol is a useful curing catalyst for epoxy resins. Such material also has improved curing activity when compared to other tertiary amine curing catalysts for epoxy resins.

In accordance with the present invention, a process is provided which comprises adding to an epoxy resin 4-N,N-dimethylamino-2-butyn-1-ol as a curing catalyst and maintaining the resulting mixture under desired curing conditions until a desired state of cure is obtained. As used herein, the expression "cure" refers to the formation of a solid hard cross-linked polymeric mass. Such expression also includes the formation of an intermediate highly viscous gel. The curing catalyst can be employed in amounts of at least about 3 weight parts per hundred weight parts of epoxy resin. Preferably, the curing catalyst is employed in amounts from about 3 to about 10 weight parts per hundred weight parts of epoxy resin. The present invention enables substantial resin viscosity increases to be obtained under room temperature conditions. Curing temperatures of 50° C. or higher may also be used if desired.

The 4-N,N-dimethylamino-2-butyn-1-ol curing catalyst can be prepared by reacting isobutanol, formaldehyde and dimethylamine in a suitable solvent, such as benzene, to form N-isobutoxymethyl-N,N-dimethylamine and then reacting this product with propargyl alcohol in the presence of a cuprous chloride catalyst and suitable solvent, such as dioxane.

Use of the novel curing catalyst in combination with an epoxy resin is described in further detail in the following example:

*Example*

Separate 15 g. portions of an epoxy resin were mixed with various amounts of 4-N,N-dimethylamino-2-butyn-1-ol. The epoxy resin was a diglycidyl ether of bisphenol A having a molecular weight of 350–400 and an epoxide equivalent (grams of resin containing 1 gram-equivalent of epoxide) of 185–192 and marketed by the Shell Chemical Company under the trade name Epon 828. The resulting epoxy resin-curing catalyst mixtures were then allowed to stand at room temperature (about 25–30° C.) for 3 days. The appearance of the various samples was observed at various time intervals. The results were as follows:

| Amount of Catalyst | | Resin Appearance | | |
|---|---|---|---|---|
| Grams | Weight parts per hundred parts of resin | After 45 min. | After 3 hours | After 3 days |
| 0.5 | 3.3 | Slightly tacky, surface hard. | Soft | Hard. |
| 1.0 | 6.7 | ----do---- | Hard tacky, surface | Do. |
| 1.5 | 10.0 | Hard, not rubbery | Hard, not tacky | Do. |
| 2.0 | 13.3 | ----do---- | ----do---- | Do. |
| 2.5 | 16.7 | Hard, not tacky | ----do---- | Do. |

The above results indicate that the novel curing catalyst in amounts as low as about 3 weight parts per hundred weight parts of resin can provide adequate curing. The above results also show no particular advantage in using more than about 10 weight parts of catalyst per hundred weight parts of epoxy resins. These results are quite surprising in view of customary curing catalyst practice with epoxy resins. In general, the amount of curing catalyst necessary for adequate curing of epoxy resins can be calculated by an empirical relation that has been found useful in industry. Since 4-N,N-dimethylamino-2-butyn-1-ol is a tertiary amine, the amount necessary to cure an epoxy resin would generally be calculated by the following formula:

phr. = $(100)(MW)/(EQ)(3N_E)$ wherein:

phr. = weight parts catalyst per hundred weight parts of resin
MW = molecular weight of the curing catalyst
EQ = epoxide equivalent of the resin
NE = the number of tertiary nitrogen atoms in the curing catalyst molecule.

According to this relation, the amount of 4-N,N-dimethylamino-2-butyn-1-ol required to cure Epon 828 would be:

$(100)(113)/(190)(3) = 19.8$ weight parts per hundred parts of resin. Since as low as 3 parts per hundred parts of resin are useful, it indicates that the novel curing catalyst of this invention is more active than would be expected for a tertiary amine.

While the above example employed Epon 828 epoxy resin, it is understood that the novel curing process of the present invention can be carried out with any other epoxy resin to achieve desired curing results.

What is claimed is:

1. A process for curing epoxy resins which comprises adding to an epoxy resin having a plurality of 1,2-epoxide groups 4-N,N-dimethylamino-2-butyn-1-ol as a curing catalyst and maintaining the resulting mixture under desired curing conditions until a desired state of cure is obtained.

2. A process according to claim 1 wherein the curing catalyst is present in an amount of at least about 3 weight parts per hundred weight parts of epoxy resin.

3. A process according to claim 1 wherein the curing catalyst is present in an amount of from about 3 to about 10 weight parts per hundred weight parts of epoxy resins.

No references cited.

WILLIAM H. SHORT, *Primary Examiner.*

T. D. KERWIN, *Assistant Examiner.*